US009085261B2

(12) United States Patent
Lu et al.

(10) Patent No.: US 9,085,261 B2
(45) Date of Patent: Jul. 21, 2015

(54) REAR VISION SYSTEM WITH TRAILER ANGLE DETECTION

(75) Inventors: Yuesheng Lu, Farmington Hills, MI (US); Joel S. Gibson, Linden, MI (US); Travis G. Johnson, Clinton Township, MI (US); Shawn T. Hunt, Pinckney, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 179 days.

(21) Appl. No.: 13/979,871

(22) PCT Filed: Jan. 25, 2012

(86) PCT No.: PCT/US2012/022517
§ 371 (c)(1),
(2), (4) Date: Nov. 12, 2013

(87) PCT Pub. No.: WO2012/103193
PCT Pub. Date: Aug. 2, 2012

(65) Prior Publication Data
US 2014/0200759 A1 Jul. 17, 2014

Related U.S. Application Data

(60) Provisional application No. 61/496,090, filed on Jun. 13, 2011, provisional application No. 61/436,397, filed on Jan. 26, 2011.

(51) Int. Cl.
*B60Q 9/00* (2006.01)
*B60D 1/24* (2006.01)
(Continued)

(52) U.S. Cl.
CPC ............... *B60Q 9/005* (2013.01); *B60D 1/245* (2013.01); *B60D 1/305* (2013.01); *B60D 1/62* (2013.01);
(Continued)

(58) Field of Classification Search
CPC ............... B62D 15/021; B62D 15/027; G06K 9/00791; B60W 50/14; B60Q 9/005; B60D 1/305; B60D 1/62; G06T 7/0042; G06T 7/2033; G06T 2207/30252
See application file for complete search history.

(56) References Cited

U.S. PATENT DOCUMENTS 4,200,361 A 4/1980 Malvano
4,214,266 A 7/1980 Myers
(Continued)

FOREIGN PATENT DOCUMENTS

JP 59114139 7/1984
JP 6080953 5/1985
(Continued)

OTHER PUBLICATIONS

International Search Report and Written Opinion dated May 25, 2012 from corresponding PCT Application No. PCT/US2012/022517.
(Continued)

*Primary Examiner* — Nicholas Kiswanto
(74) *Attorney, Agent, or Firm* — Gardner, Linn, Burkhart & Flory, LLP

(57) ABSTRACT

A rear vision system for a vehicle includes a rearward facing camera disposed at a rearward portion of a vehicle equipped with the rear vision system. The rearward facing camera is operable to captures images rearward of the equipped vehicle. When a trailer is near and/or attached to the equipped vehicle and is rearward of the equipped vehicle, a processor is operable to process the captured images and, responsive at least in part to such processing, is operable to determine a trailer angle of the trailer relative to a longitudinal axis of the equipped vehicle.

20 Claims, 5 Drawing Sheets

(51) Int. Cl.
*B60D 1/30* (2006.01)
*B60D 1/62* (2006.01)
*G06T 7/00* (2006.01)
*G06T 7/20* (2006.01)

(52) U.S. Cl.
CPC .............. *G06T 7/0042* (2013.01); *G06T 7/2033* (2013.01); *G06T 2207/30204* (2013.01); *G06T 2207/30252* (2013.01)

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi et al. |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |

(56) References Cited

U.S. PATENT DOCUMENTS

| | | |
|---|---|---|
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,480,104 B1 | 11/2002 | Wall et al. |
| 6,483,429 B1 | 11/2002 | Yasui et al. |

(56) References Cited

U.S. PATENT DOCUMENTS

| | | |
|---|---|---|
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,721,659 B2 | 4/2004 | Stopczynski |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,006,127 B2 * | 2/2006 | Mizusawa et al. ............ 348/118 |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,158,015 B2 | 1/2007 | Rao et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,483,058 B1 | 1/2009 | Frank et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 8,010,252 B2 | 8/2011 | Getman et al. |
| 8,017,898 B2 | 9/2011 | Lu et al. |
| 8,038,166 B1 * | 10/2011 | Piesinger ..................... 280/477 |
| 8,063,752 B2 | 11/2011 | Oleg |
| 8,094,170 B2 | 1/2012 | Kato et al. |
| 8,095,310 B2 | 1/2012 | Taylor et al. |
| 8,098,142 B2 | 1/2012 | Schofield et al. |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert et al. |
| 8,411,998 B2 | 4/2013 | Huggett et al. |
| 2001/0001563 A1 | 5/2001 | Tomaszewski |
| 2002/0113873 A1 | 8/2002 | Williams |
| 2003/0137586 A1 | 7/2003 | Lewellen |
| 2003/0222982 A1 | 12/2003 | Hamdan et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0147321 A1 | 6/2008 | Howard et al. |

(56) References Cited

U.S. PATENT DOCUMENTS

| | | |
|---|---|---|
| 2008/0192132 A1 | 8/2008 | Bechtel et al. |
| 2008/0231701 A1 | 9/2008 | Greenwood et al. |
| 2009/0113509 A1 | 4/2009 | Tseng et al. |
| 2009/0143967 A1 | 6/2009 | Lee et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2011/0050903 A1* | 3/2011 | Vorobiev ............... 348/148 |
| 2012/0045112 A1 | 2/2012 | Lundblad et al. |
| 2012/0265416 A1* | 10/2012 | Lu et al. ............... 701/70 |
| 2014/0218506 A1* | 8/2014 | Trombley et al. ............ 348/113 |

FOREIGN PATENT DOCUMENTS

| | | |
|---|---|---|
| JP | 6414700 | 1/1989 |
| JP | 4114587 | 4/1992 |
| JP | 05050883 | 3/1993 |
| JP | 6227318 | 8/1994 |
| JP | 0769125 | 3/1995 |
| JP | 07105496 | 4/1995 |
| JP | 2630604 | 7/1997 |
| JP | 2003-083742 | 3/2003 |

OTHER PUBLICATIONS

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Technologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

* cited by examiner

REAR VISION SYSTEM WITH TRAILER ANGLE DETECTION

CROSS REFERENCE TO RELATED APPLICATIONS

The present application is a 371 national phase application of PCT Application No. PCT/US2012/022517, filed Jan. 25, 2012, which claims the priority benefit of U.S. provisional applications, Ser. No. 61/496,090, filed Jun. 13, 2011; and Ser. No. 61/436,397, filed Jan. 26, 2011.

FIELD OF THE INVENTION

The present invention relates generally to rear vision systems for vehicles and, more particularly, to rear vision systems having a rearward facing camera at a rear portion of a vehicle.

BACKGROUND OF THE INVENTION

Rear backup cameras and vision systems are known for use in vehicles. Examples of such systems are described in U.S. Pat. Nos. 7,859,565; 6,611,202; 6,222,447; 5,949,331; 5,670,935; and/or 5,550,677, which are hereby incorporated herein by reference in their entireties. Such systems may display images for viewing by the driver of the vehicle that provide a view rearward of the vehicle.

SUMMARY OF THE INVENTION

The present invention provides a means for detecting the angle of a trailer being pulled behind a vehicle by using a rear view camera or multi-camera surround view, system or the like. A camera is mounted at a rear end or rear portion of the pulling vehicle, with the camera having a rearward field of view (such as a wide angle rearward field of view) rearward of the vehicle. A processor, such as a digital processor or FPGA or digital signal processor (DSP) or ASIC or camera imager SOC or other suitable processing means or the like, may process the images or image data (as captured by the rearward facing camera) of the trailer being pulled or towed by the vehicle and may determine the angle of the trailer in relation to the pulling vehicle in real time. Optionally, the control or system may, responsive to processing of the captured images, generate an alert to the driver of the vehicle and/or control or operate one or more accessories or systems of the trailer or vehicle (such as a brake system or steering system or display system or the like), such as in response to the determination of the angle of the trailer.

These and other objects, advantages, purposes and features of the present invention will become apparent upon review of the following specification in conjunction with the drawings.

DESCRIPTION OF THE PREFERRED EMBODIMENTS

Figure 1:
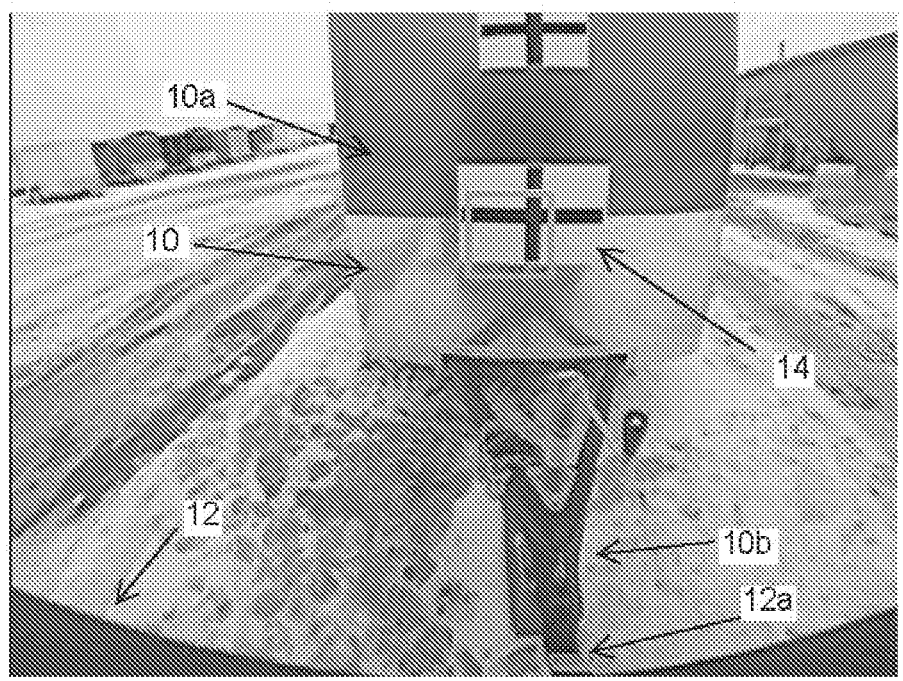
FIG. 1 is a perspective view of a trailer attached to a vehicle equipped with a rear vision system in accordance with the present invention.

Referring now to the drawings and the illustrative embodiments depicted therein, a rear vision system for a vehicle is operable to detect the angle of a trailer 10 that is pulled behind a vehicle 12 by using rear view camera or multi-camera surround view system. A camera is mounted at the rear end portion of the pulling vehicle 12. An image processor (such as a digital processor or FPGA or DSP or ASIC or camera imager SOC or other suitable processor or processing means) is operable to process the images of the trailer and determines the angle of the trailer in relation to the pulling vehicle in real time.

The detection of the trailer angle relative to the vehicle is accomplished by detecting a portion of the trailer and determining the location of the detected portion relative to the towing vehicle, whereby the angle can be determined or calculated based on known geometries of the trailer and vehicle and the location of the camera on the vehicle. For example, the system may operate to track and determine a sideward movement of a trailer portion or target and, utilizing the known geometries, such as the distance of the trailer portion or target from the camera and/or the distance of the trailer portion or target from the pivot point or joint at which the trailer tongue attached to the trailer hitch of the vehicle, determine the angular movement of the trailer about the trailer hitch and relative to the vehicle, such as to determine a sway or swing of the trailer relative to the towing vehicle or to determine a rearward trajectory or path of travel of the trailer during a reversing maneuver of the vehicle and trailer, or the like.

The detection of the trailer portion or target can be done with an added target 14 on the trailer 10 or without an added target on the trailer (whereby the camera and processor may operate to detect a particular known or selected portion of the trailer). If a target or icon or indicia or the like is added to the trailer, the added target may, for example, be printed on a paper sheet, a plastic sheet or a reflective sheet or the like, which may be adhered to or otherwise disposed at or attached to a forward portion of the trailer, or optionally, the target may be otherwise established at or on the trailer, such as, for example, by painting or etching or otherwise establishing a target or icon or the like on a wall or panel or other forward portion of the trailer (such as a portion or structure of the tongue or frame of the trailer) or the like.

An example of a using an added target to a trailer is shown in FIG. 1, where a target 14 (such as a cross-shaped figure as illustrated) is added to a forward wall 10a of a trailer 10. By processing the images captured by the rearward facing camera and recognizing or identifying the target in the captured image and finding or determining the coordinates of the target in a captured image, the trailer angle relative to the vehicle can be determined. By repeating the above steps on multiple frames of the continuous video images, the change of trailer angle can be tracked continuously and in real time.

The target 14 may comprise any suitable shape or icon or indicia or the like. For example, the target may be in the shape of a cross, a triangle, a circle, or any other shape or shapes, or multiples of any suitable shape or shapes, or any suitable combination of shapes (preferably having sharp lines or structure that can be readily detected and identified via image processing). The target can be mounted on a wall or a surface or a structure of the trailer that is near or facing the camera at the rear end of the pulling vehicle. Optionally, the target can be mounted at or established on the tongue 10b of the trailer, which is the structure that connects the trailer to the trailer hitch 12a of the towing or pulling vehicle 12.

The target may be detected and recognized via any suitable image processing and algorithms. For example, suitable or preferred target detecting algorithms include a regressive 2-D histogram that searches for and detects the center of a pattern (such as a pattern like the cross or intersecting lines in FIG. 1). Another suitable type of algorithm is an edge detection algorithm. Optionally, and desirably, a target with designed high contrast edges may be used. With such an application, the processor can detect and track the trailer angle at the rear of the vehicle by detecting and locating and tracking or monitoring the coordinates of these signature edges. Optionally, the edge detection function or algorithm may comprise a Sobel gradient edge detection algorithm or other edge detection algorithms commercially available, and/or edge detection algorithms of the types described in U.S. Pat. Nos. 7,720,580; 7,038,577; 6,353,392; and/or 6,313,454, which are hereby incorporated herein by reference in their entireties. Another suitable type of algorithm is image pattern matching, which will be described in detail below.

Figure 2:
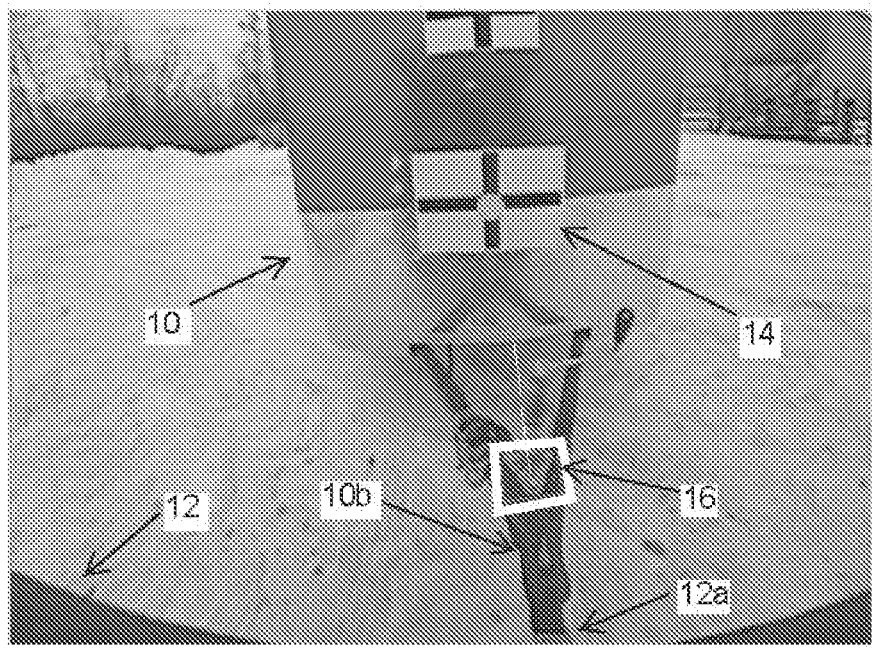
FIG. 2 is a perspective view of another trailer attached to a vehicle equipped with a rear vision system in accordance with the present invention.

In the case of detection without an added target, a part or structure of the trailer may be identified and used as the "target" for image processing. Because an added target (such as described above) can be worn off, blown away by wind, or soiled by dirt, the addition of a separate target may affect or reduce the trailer angle detection accuracy in certain situations. Thus, a trailer angle detection system that does not include an add-on target on the trailer may be preferred. An example of such a trailer angle detection and tracking system is shown in FIG. 2, where a part or portion or region or structure of the trailer tongue 10b serves as the "target" and is used as an image pattern or pattern matching template. As shown in FIG. 2, a small triangle structure on the tongue (shown as outlined by a polygon at 16) may be used as the pattern or structure that is to be matched to the template. An image processing algorithm, such as an image pattern matching algorithm running on the digital processor, finds and matches the template with the structure in the captured image.

If the pattern is matched, the matched pattern's coordinates in the image and the rotating angle of the matched pattern is determined by the algorithm. The trailer angle can then be calculated from these values. By repeated performance of the above mentioned pattern matching on the continuous or sequential or subsequent frames from the camera video output, the trailer angle can be continuously tracked and/or monitored.

The coordinates of the detected target in a captured image can be further transformed to the angle of trailer by applying a set of formulas. The formula can be implemented in the processor in the form of a set of arithmetic formulas, or may be implemented in the form of a look up table or tables. The formula is formed and determined by the dimensional characteristics of the trailer, the distance between the trailer body (or the location of the target or detected pattern or portion of the trailer) and the pulling vehicle (and/or the distance between the target and the pivoting joint at which the trailer is attached to the vehicle), the camera mounting position and angle, and the camera lens distortion characteristics.

Applications of Trailer Detection:

The rear view camera-based trailer angle detection can be used in, but is not limited to, several applications, including a trailer sway detection system (that detects a sway or swing of the trailer while the vehicle is towing the trailer in a forward direction along a road or highway), a rearward backup assist system (that detects the angle of the trailer and determines a reversing path or trajectory of the trailer during a reversing maneuver of the vehicle and trailer), and a trailer hitching system (that detects the trailer and guides the driver during backing up of the vehicle towards a trailer so that the trailer hitch of the vehicle is generally aligned with the tongue of the trailer).

Trailer Sway Detection and Alert/Compensation System.

When a trailer is pulled behind a vehicle at a relatively high speed, a lateral swing or sway of trailer can cause instability of the trailer and its pulling vehicle. By detecting the trailer angle in real time, the system of the present invention can detect the onset of lateral swing or sway of the trailer and may, responsive to such a detection, alert the driver of the swing or sway or control one or more vehicle or trailer systems or accessories to compensate for the detected swing or sway of the trailer. For example, the system may, responsive to a detection of a threshold degree of a lateral swing or sway of the trailer relative to the vehicle, be operable to generate an alert signal to the driver of the vehicle (such as an audible alert or visual alert or haptic alert or the like) to alert the driver of a potentially hazardous situation. Optionally, the system may control the brakes and/or steering of the vehicle and/or trailer to control the vehicle and trailer, such as in response to a detection of a threshold degree of sway or swing of the trailer relative to the vehicle. For example, the system may provide a closed loop control of the trailer angle by using individual braking of the pulling vehicle wheels and/or the trailer wheels to control or adjust or correct for the trailer swing or sway. Optionally, a steering wheel angle control (that may control or adjust the steering angle of the vehicle's wheels) or the like can also be part of closed loop control of trailer sway.

The trailer angle detection based on real time target or target-less image processing and/or algorithms can provide high speed and real time reading of the trailer angle of the trailer being towed by the pulling or towing vehicle. This reading can be used in real time trailer sway control. Optionally, the threshold level or degree of sway or swing of the trailer relative to the vehicle may be selected or preset, or may be dynamic, whereby the threshold degree may vary responsive to the speed of the vehicle and/or load of the trailer and/or the like. Optionally, and desirably, the system may only generate the alert and/or control the vehicle/trailer system or systems responsive to the detected swing or sway reaching or exceeding the threshold level and while the vehicle is traveling forwardly along the road.

Projection of Trailer Position During Trailer Backing Up.

The normal view of a backup camera on a trailer pulling vehicle is typically blocked by the trailer, and thus such a backup camera cannot provide visual backup assistance to the driver when the trailer is attached to the vehicle. However, the camera system of the present invention is operable to detect the angle of the trailer axis with respect to the pulling vehicle, and with the knowledge of the trailer dimensional characteristics (such as wheel position and distance from the vehicle and the like), the processor can calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Optionally, the system may provide an alert (such as an audible alert or visual alert or haptic alert or the like) to alert the driver of a potentially hazardous situation during the reversing maneuver, such as responsive to detection of an object rearward of the trailer and in the path of the trailer (such as via processing of images captured by sideview cameras of the towing vehicle and/or processing of images captured by a rearward viewing camera at the rear of the trailer or the like). The alert may comprise any suitable alert, such as an alarm or tone or audible alert or a visual alert such as a highlighting of the displayed video images or the like in response to a detection of an object rearward of or at or near the rearward path of the trailer. Optionally, the system may control the brakes of the vehicle and/or trailer to slow or stop rearward movement of the vehicle and trailer in response to detection of an object in the rearward path of travel of the trailer and a determination that a collision may occur between the trailer and object.

Trailer Hitching.

Backing up a vehicle to hitch a trailer is not always intuitive process. If the position of the trailer hitching part is detected by identifying the tongue of the trailer that is to be attached to the vehicle, the processor can calculate a trajectory of the vehicle's hitch and guide the driver to turn the steering wheel of the vehicle and follow the trajectory to back the vehicle up to and in alignment with the trailer tongue for hitching the trailer to the vehicle. It is also envisioned that the control system may automatically turn the steering wheel of the vehicle to follow the calculated trajectory to position the vehicle's at the trailer tongue for hitching the trailer to the vehicle. During the backing up process, a real time detection and tracking of a target at or on the trailer provides feedback and adjustment to the turning or control of the steering wheel of the vehicle.

Thus, the present invention provides a trailer monitoring system that may detect the angle of a trailer being towed by a vehicle relative to a longitudinal axis of the towing vehicle. The trailer angle detection and monitoring system thus can detect and monitor the angle of the trailer relative to the vehicle while the trailer is being towed along a road or highway, and may be operable to adjust or control one or more systems of the vehicle and/or trailer (such as a brake system of the vehicle and/or trailer and/or a steering system of the vehicle or the like) to correct for or adjust responsive to a detected sway or swing of the trailer during forward towing of the trailer. Optionally, the trailer angle detection system may assist the driver in backing up the trailer, such as via providing a graphic overlay at a video display of the vehicle, so as to guide the driver during a reversing maneuver with the trailer rearward of the vehicle. Optionally, the trailer angle detection system may assist the driver in backing up to an unhitched trailer to assist the driver in aligning the vehicle hitch with the tongue of the trailer.

Figure 3:
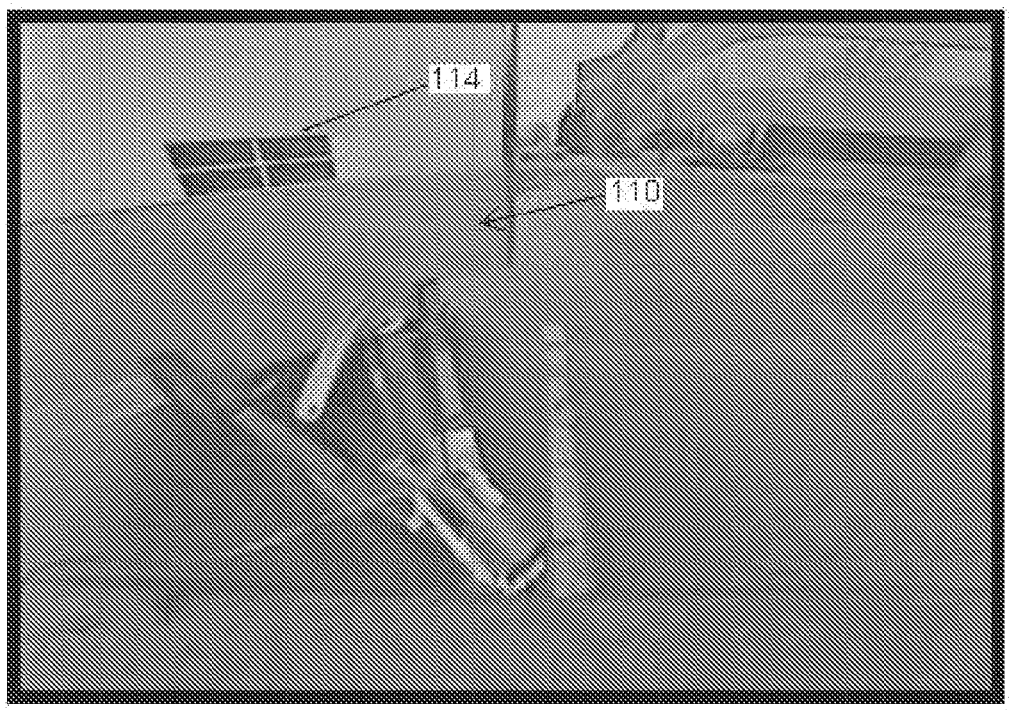
FIG. 3 is a perspective view of another trailer attached to a vehicle equipped with a rear vision system in accordance with the present invention.

Cross Shaped Target Histogram Algorithm:

As discussed above, a pattern searching image algorithm based on image histogram can be used to detect the target. A cross-shaped target (such as a cross-shaped target 114 at the trailer 110 of FIG. 3) may be chosen as one type of the target for the histogram algorithm. The target can be a white cross on a black background (such as shown in FIG. 3) or a black cross on a white background (such as shown in FIGS. 1 and 2). Optionally, a colored cross shape pattern may also be used, but it is preferred that the colors be selected so that the cross and the background have good contrast in the captured images.

Figures 4, 5:
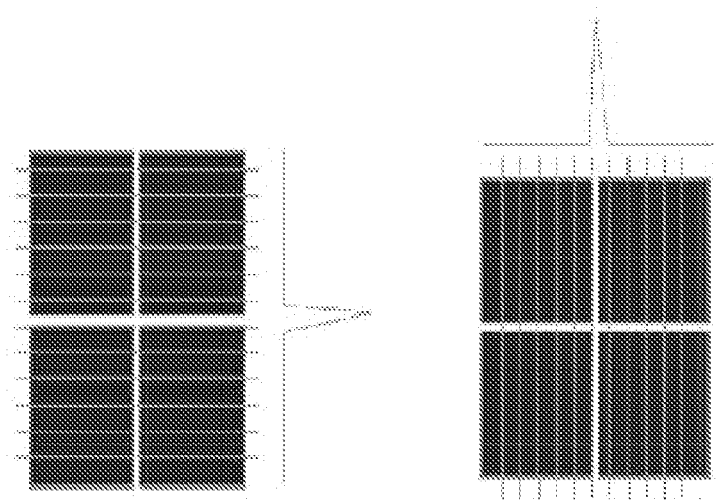
FIG. 4 is a graphical depiction of an output of a histogram algorithm for detecting a vertical portion of the cross-shaped target on the trailer of FIG. 3.
FIG. 5 is a graphical depiction of an output of the histogram algorithm for detecting a horizontal portion of the cross-shaped target on the trailer of FIG. 3.

An initial pattern search may be conducted in the image to roughly locate the cross shaped target. This may be achieved by a similar pattern matching that involves a pre-recorded pattern template. After the rough location of the center of the cross is located, a smaller window is drawn around the cross center. The window may be, for example, about 32 by 32 pixels in size. The histogram is separately done in rows (vertical histogram) and columns (horizontal histogram). Each row and column is one pixel wide. The pixel brightness is summed in each row and column. The row and column with maximum summed values represent or are indicative of the center of the target or cross. The center of the target or the pixel coordinate of the center of the cross is used to represent the trailer angle. The histogram computation of the center of the target may be performed on every frame that the rear view camera generates. The target center coordinate may be used as the center of the histogram window for next frame. This provides a good tracking of the target when the trailer turns and target moves in the image. A graphical depiction of the histogram is shown in the FIGS. 4 and 5, with FIG. 4 showing a vertical histogram and FIG. 5 showing a horizontal histogram.

Sub-Pixel Resolution:

In order to reach a higher or enhanced accuracy for a trailer angle reading from the cross-shaped target, the sub-pixel resolution of the target location may be utilized. One example of such sub-pixel searching may, once the histogram of row and column in the search window produces a location of the cross target center coordinates, compute a sub-pixel center using the center of mass method. The center of mass computation is performed separately to columns and rows. In column center of mass computation, the following steps are taken:

1. The average column sum is first subtracted from each column;
2. Treating the column sums as mass, the center of mass is computed by the following equation:

$$\text{Center of Mass} = \frac{\sum p_i s_i}{\sum s_i};$$

where $p_i$ is the pixel location and $s_i$ is the column sum; and

3. The numerator and denominator are computed separately and converted from integer to floating point numbers, and the center of mass in column dimension coordinates is computed accordingly in the form of floating point number.

The center of mass in row dimension is computed in the same method as the column center of mass. The new and higher resolution center of target coordinate is thus calculated. With this approach, about a one degree of trailer angle resolution and accuracy may be achievable.

Some deviation of the above formulas and computation can also produce the same or similar results. For example, instead of subtracting by the column average, each column could be subtracted by the minimum sum across all columns. The methods other than center of mass method described above can also be used to reach sub-pixel resolution. It is in the same spirit of using a plurality of pixels to reach sub-pixel resolution.

Color Pattern Matching:

As described above, the system may utilize pattern matching of a feature on a trailer tongue to measure the trailer angle with a rear view camera in the trailer pulling vehicle. A pattern template may be pre-generated and stored in the system memory and may be searched and matched in the real time camera images. When a pattern is matched, the position and angle of the pattern are calculated. The position and angle information of the matched pattern in the image can be used to calculate the trailer angle. However, using a native feature on the trailer sometimes may not produce accurate enough position and angle information, because the feature to be matched does not always stand distinctly from its surrounding; therefore pattern matching algorithm may produce inaccurate results. In order to address this potential issue, a technique of color pattern matching with a simple and effective is discussed below.

The color pattern matching technique of the present invention has the advantage of having one more matching criteria (pattern and color), than the pattern matching technique described above, which relies on only monochrome geometric features and patterns. As a result, the matching reliability and accuracy of color pattern matching is improved and enhanced as compared to that of monochrome pattern matching. In the implementation of this invention, certain colors are preferable than others. For example, red and green color patterns are more readily discernible and processable as compared to, for example, blue, yellow and orange colors, since there are often dividing lines and signs on the road surface and parking ground or areas with blue, yellow and orange colors, yet there are relatively fewer red and green dividing lines and signs on the road surface and parking ground or areas. In addition, a pattern with a mix of different colors can be used to further increase pattern matching accuracy.

Single Target:

In order to increase the pattern matching accuracy of the system, a simple color target may be disposed at or on the trailer tongue structure and the system may process the images to detect the orientation of the color target instead of using existing or native features or patterns on the trailer tongue. The color target may comprise a color tape applied to certain portions of the trailer or trailer tongue (such as colored duct tape or the like that one can easily purchase from a hardware store). Optionally, the color target may comprise a colored feature or structure that is designed in and embedded into the trailer tongue structure by the manufacturer of the trailer, or the color target may be provided as a special part supplied to the customers from automakers, such as the automaker of the towing vehicle that has the imaging system of the present invention installed therein. For example, one part of a trailer tongue that can be used to put a colored tape on may comprise the lever above the hitch ball that is used to lift and unlock the hitch, while another part of the trailer tongue that may have the tape applied thereto is the pulling arm or arms of the trailer. The tape may comprise any suitable colors, such as, for example, red or green, or other colors or mix of colors. The tape may have a preferred rectangular shape and may have, for example, a width of about one inch and a length of about six inches or longer. Other dimensional sizes may also be used in accordance with the present invention. Optionally, the rectangular target can also be combination of two or more colors to increase pattern matching accuracy. The target may be attached to the trailer structure via any suitable attaching means, such as by gluing, bolting, printing or other means.

Figure 6:
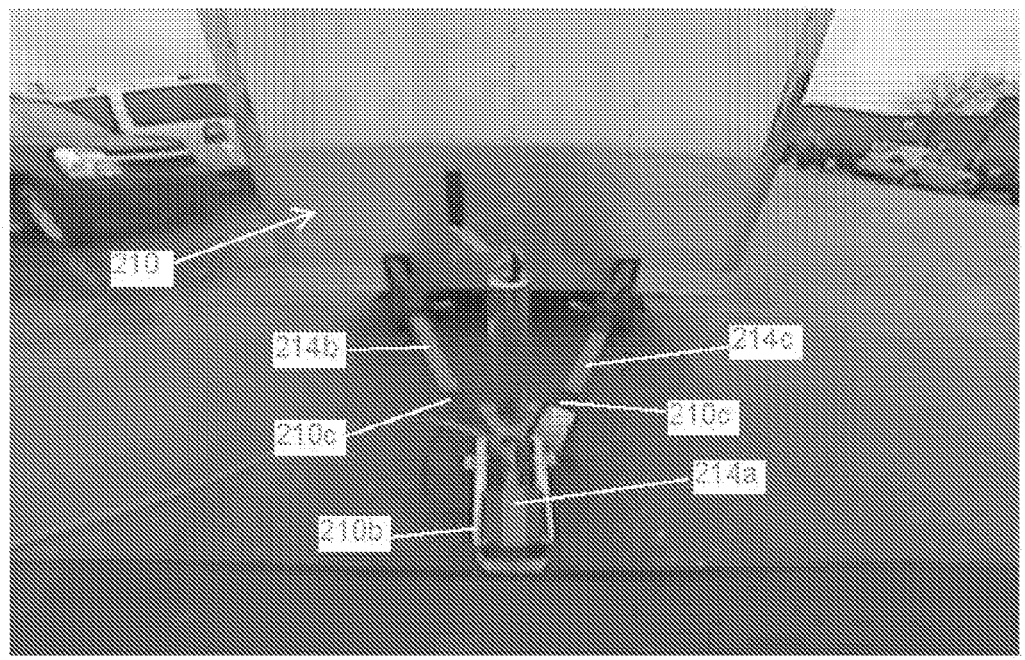
FIG. 6 is a perspective view of another trailer attached to a vehicle equipped with a rear vision system in accordance with the present invention, showing colored patterns at the tongue of the trailer for detection by the rear vision system.
Figure 7:
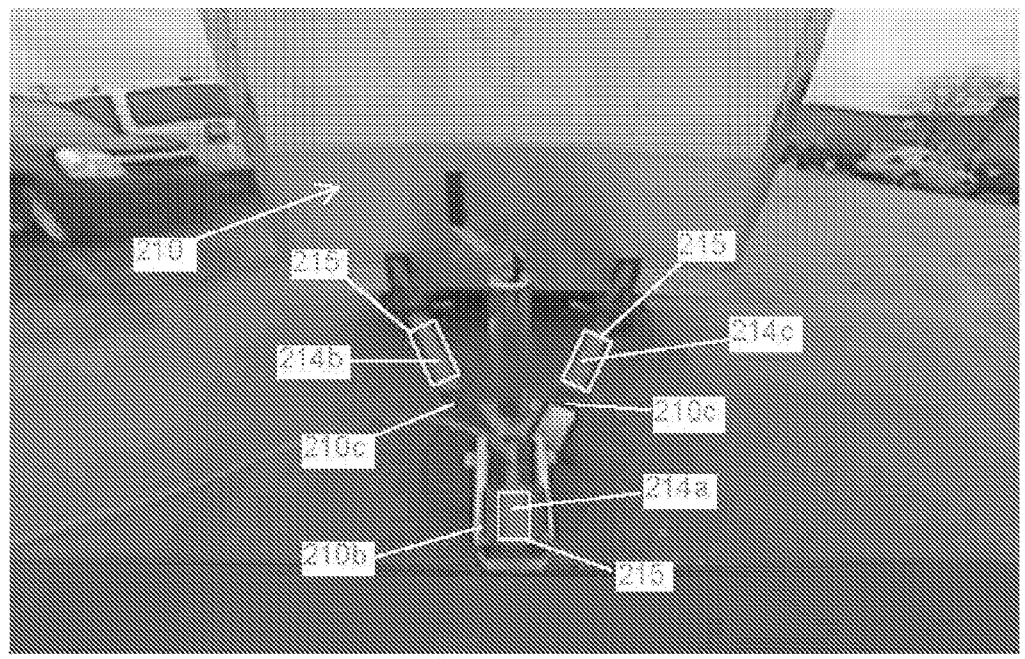
FIG. 7 is another perspective view of the trailer of FIG. 6, showing detection of the colored patterns at the tongue of the trailer.

Multiple Targets:

Optionally, and with reference to FIGS. 6 and 7, multiple targets 214a, 214b, 214c can be used at or on the trailer 210 or trailer tongue 210b or trailer pulling arms 210c to increase pattern matching accuracy. When a trailer swings to a large angle, certain vertical parts of the trailer may partially or entirely block a target that is placed on one arm of the trailer. However, when multiple targets are used on both sides of the trailer or on both pulling arms 210c, at least one target is available and viewable at all trailer angles. For normal and small trailer angles, both targets 214b, 214c can be simultaneously used to increase accuracy. In certain unfavorable lighting conditions, like strong reflection of sun light or street light from a target to camera, the target may appear to lose some of its color due to washout effect. However, because of the nature of the narrow angular reflection of strong light from the sun or a street light, one target may be washed out but another target on a different pulling arm is most likely not washed out. This will limit or substantially preclude or avoid the loss of pattern tracking and detection accuracy in such unfavorable lighting conditions.

Matching a Rectangular Target:

A target 214a, 214b, 214c with an elongated rectangular shape may be selected for a pattern matching target for use with the system of the present invention. For example, a piece of tape of a selected color (such as, for example, green tape for targets 214a and 214c, and red tape for target 214b, or green or red tape may be used for all three targets, or other colored tape or other coatings or markers may be used for one or more of the targets) may be placed on a horizontal part of trailer tongue that is visible to the pulling vehicle's rear view camera. The tape target shows as a rectangle or trapezoidal color object (such as highlighted in FIG. 7) in the rear view camera's image. When the trailer turns to a different angle relative to pulling vehicle, the tape target turns in the camera image as well.

During such movements, the primary characteristics of each of the tape targets, such as shape and dimensional size, changes very slightly because the rear view camera usually has a wide angle field of view and thus optical distortion of field of view exists. However, one property of the target, the center line of the tape pattern, still reflects the angle of the tape in the captured images. In the pattern matching technique of the present invention, the algorithm rotates the pattern template with fine steps and finds the best match of the template to the target in the real time image. If the pattern matching template 215 (FIG. 7) is extracted from the image when the trailer is in its straight position, or zero trailer angle, the angle of template rotation is the angle of tape target rotation from its straight or non-angled orientation. The pattern matching computation can be realized in the form of cross-correlation of pattern matching template and the image to be matched. Other types of algorithmic computation can also be used to realize the same result.

Thus, for example, the system may process the captured images to determine the location of the colored targets at the trailer (where the target or targets may comprise the same color or different colors, such as one red target and two green targets or the like), and when the targets are detected, the system may calculate the angles of the targets and/or may match the detected targets to a template that is indicative of the angles of the targets, whereby the angle of the trailer relative to the vehicle may be determined by the system. Thus, the present invention provides a target pattern design (such as shape and color) at the trailer or trailer tongue that the imaging system can readily discern and process to determine the trailer angle relative to the vehicle. The advantage of this target pattern design includes the following:

1. The target is relatively simple and inexpensive—one can buy colored duct or painting or masking tape from a hardware store, and may cut a piece of 6 inches or longer part and stick it to the pulling arm of the trailer. Other types of off-the-shelf tapes or paints may be used. Such a colored target thus is not specially designed and made just for the trailer and imaging system, so the cost may be low.
2. The processing is performed via a simpler algorithm—a pattern matching template 215 (FIG. 7) may be readily constructed as a rectangle with a colored rectangle shape in the middle. The simplicity of the pattern template reduces the template size in the system memory and the computation requirement of the pattern matching algorithm.
3. Because of its rectangular nature, the angle of the matched pattern directly correlates to the angle of pulling arm in the camera image and to the trailer angle, thus reducing computational complexity and increasing trailer angle detection accuracy.

Color Image Components Used in Pattern Matching:

A color image captured by the camera or image sensor contains both color and brightness information, which sometimes are also called chrominance and luminance information. In color pattern matching algorithms such as are described herein, both chrominance and luminance information of images are used to increase the matching performance (such as the accuracy and speed of matching) of the system of the present invention.

As one type of representation, a color image can be represented by Color Hue (H), Color Saturation (S) and Luminance (L). Hue information tells the color type of an object (green, blue or yellow), while saturation tells the vividness of the color, and luminance tells the brightness of the object in the image. One can extract one or more layers of the above color information from a color image and process them individually. Another type of color representation is Red (R), Green (G) and Blue (B) components of color image. R, G, B color components can usually be affected directly by a change in brightness, which is a common condition in vehicle systems running in real world conditions. In contrast, color hue is not affected by image brightness change. Therefore, in real world vehicle running conditions, one can reliably use color hue as a critical matching criteria. Color hue and saturation are also typically more sensitive than RGB component in telling small color differences. A small and subtle color change of two adjacent objects, such as one target that is a real target, and another one that is a nearby object with close shape and color, can be better distinguished by color hue than by RGB component. Color saturation and luminance may also play an important role in accurate color pattern matching. Optionally, the system may mix a green component in RGB color space and HSL color space to produce optimized color pattern matching result. The following are several examples of different ways of implementations of the algorithms suitable for use in the trailer detecting system of the present invention.

Example #1

In this example, luminance and saturation are used as the primary components, while hue is the secondary component, for image processing and target matching. A pattern template is extracted by luminance and saturation components of the target as the pattern template. Color hue is the secondary criterion that is extracted from the match template (the color tape) to narrow down or verify that a matched pattern is the true target. In processing, the luminance layer and the saturation layer of the image are extracted out of the original image and then summed together as a new image. The pattern matching of the L+S template in the new image is performed. One or several potential matches may be reached with different scores. Only one of them should be the real target. On each potential match, a color hue value is checked against the color hue value of the original color template. In other words, the color hue is used to narrow down the potential matches to a match with the real target. In situations where only one target is matched to the L+S template, the hue is applied to check the confidence level of the match.

Example #2

In this example, color saturation is used as the primary component, while color hue is the secondary component, for image processing and target matching. The pattern template is extracted by saturation (S) components of the target as the pattern template. The color hue (H) is the secondary criterion that is extracted from the match template (the color tape) to narrow down or verify that a matched pattern is the true target. In processing, the luminance layer and the saturation layer of the image are extracted out of original image and then summed together as a new image. The pattern matching of the S template in the new image is performed. One or several potential matches may be reached with different scores. Only one of them should be the real target. On each potential match, a color hue value is checked against the color hue value of the original color template. In other words, the color hue is used to narrow down the potential matches to a match with the real target. In situations where only one target is matched to the S template, the hue (H) is applied to check the confidence level of the match.

Example #3

In this example, such as for applications with a known and defined color tape target, one can use the direct primary color components (R, G or B) as the primary component of pattern matching. For example, when the tape is green, a green component is used with the luminance component as the primary matching components. The pattern template is extracted by Luminance+Green components of the target as the pattern template. The color hue is the secondary criterion that is extracted from the match template (the color tape) to narrow down or verify that a matched pattern is the true target. In processing, the luminance layer and the green layer of the image are extracted out of original image and then summed together as a new image. The pattern matching of the L+G template in the new image is performed. One or several potential matches may be reached with different scores. Only one of them should be the real target. On each potential match, a color hue value is checked against the color hue value of the original color template. In other words, the color hue is used to narrow down the potential matches to a match with the real target. In situations where only one target is matched to the L+G template, the hue is applied to check the confidence level of the match.

Thus, the system of the present invention may provide one, two or three (or more) color targets disposed at a trailer surface, such as at or on one or more portions of the trailer tongue and/or pull arms, whereby the system processes the image data captured by the imaging device to determine when a detected target or trailer portion matches a target template. For example, and with reference to FIGS. 6 and 7, three color tape targets 214a, 214b, 214c are placed on the trailer tongue 210b and pulling arms 210c, and the system processes captured image data to determine if any portions of the captured image data are indicative of the pattern template 215. As shown in FIG. 7, the system may achieve pattern matching of one or all three color patterns to determine the angle of the trailer relative to the towing vehicle.

Real Time Control of Camera Exposure and Color:

In real world driving conditions, illumination at the scene, and especially at the target, is not controlled due to light illuminating the scene from various sources, including sunlight, streetlights and the like. In some conditions, for example, sun light or street light at night is directly reflected by the target to the camera. The resulting glare-like reflection may cause the target to be saturated and washed out, and thus the target may lose color information. The pattern matching accuracy thus may be degraded because of target saturation. In other conditions, a shadow of the trailer or of the pulling vehicle cast on the target region may cause the target to darken, and this may also affect the pattern matching accuracy.

A method to remedy these issues may include actively controlling the camera's exposure to maintain a targeted or desired target image quality. Such an active camera exposure control can be achieved at the camera level or via a communication link between the camera and controller or ECU or the like. The communication link can be a CAN, LIN and/or other forms of serial and parallel communication protocols or channels. For example, the system may use an existing LIN bus connection between the rear view camera and the ECU of the vehicle, such as by utilizing aspects of the camera and communication systems produced by Magna Electronics Inc. of Mich. The control algorithm continuously monitors pixel values of the target area in the captured images, and once the control algorithm detects that the target image is near saturation, the system may lower the image pixel values by reducing exposure time or gain or both. Likewise, when a shadow is cast over the target, the active exposure control can detect the darkening of the target and may raise the pixel value levels by increasing exposure time or gain or both.

When the camera is running in different scene environments, the auto white balancing algorithm in the camera may actively adjust color of the image to reach a white balance of the whole image. However, if a scene contains a significantly large and colorful object, for example, if a large area of green grass, or a large brown colored building is in the image, the auto white balancing algorithm will adjust the color parameters of the camera to make the whole image white balanced. As the result, some local object's color may be changed significantly from its real color. This will change the detected color of the target and possibly affect the color pattern matching accuracy. Similar to the above active exposure control, the active camera control through a camera—ECU communication or within the camera can actively control the camera color parameters to maintain the color of the target region to be constant or within a predetermined or selected range and thus maintain the pattern matching accuracy.

The active control of the camera exposure and white balance and color could result in the overall image quality to be non-favorable for a driver viewing the images in a vehicle display. However, this is not typically a concern since, when a trailer is hitched to the pulling vehicle, the rear view image is rarely used because of the blockage of its field of view by the trailer. Furthermore, even in rare occasions that the driver desires or needs to view the space between vehicle and trailer, that area is viewable since the control of exposure and color is tailored to a best image quality around that area which is close to the target.

Figure 8:
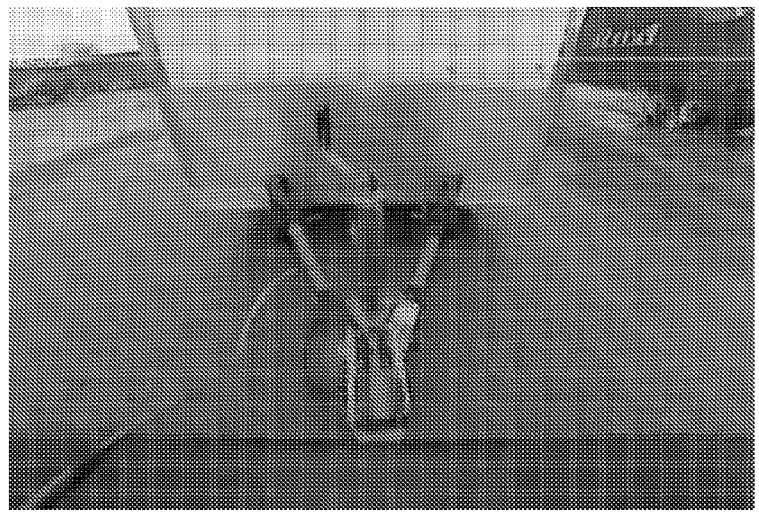
FIG. 8 is a perspective view of an image captured of another trailer attached to a vehicle equipped with a rear vision system in accordance with the present invention, with a feature extraction and matching algorithm running, and with each feature point having a descriptor that can be matched from frame to frame.

Feature Extraction and Matching Implemented in Hardware:

The present invention may provide an algorithm that detects features in a reference frame for detecting the trailer in subsequent frames. The algorithm first detects corners in a reference frame. A descriptor is built for each corner found that can be statistically matched in subsequent frames. As can be seen with reference to FIG. 8, a trailer scene can be imaged or shown with the feature extraction algorithm running. Each feature point has a descriptor that can be matched from frame to frame.

The algorithm can be run at, for example, about 30 frames per second at 640×480 resolution when implemented on a PC. This algorithm may be ported to run on a single-board computer, such as a computer that has an ARM Cortex-A8 processor and Texas Instruments C64x+ DSP and/or the like. The algorithm can be ported and designed to other digital processors, such as DSP, FPGA, ASIC or system-on-chip (SOC) in a separate ECU while the video is streamed into the ECU through signal cable from a separate camera. Optionally, above digital processors that are small and consuming lower power, may be integrated into a compact camera and eliminate or reduce or obviate the need to have a separate ECU and cable.

The algorithm is suitable for use in the trailer angle detection system of the present invention because instead of asking the customer to affix a target to their trailer, the system can use existing, natural features of the trailer instead. This eliminates the need of using any added targets that are added onto or incorporated on the trailer, such as the targets described above, and also eliminates the potential user errors from the customer measuring distances and entering numbers into the system graphical user interface.

Trailer Straight Algorithm:

Optionally, the present invention may provide a trailer straight algorithm to determine when the vehicle and trailer are straight in order to calibrate and apply an offset correction to the angle calculation. Such an algorithm or approach combines vehicle dynamics with computer vision techniques. The trailer angle detection system may be on the vehicle network, which allows it to receive vehicle information, such as individual wheel speed, steering wheel angle, and/or the like. When the vehicle pulls trailer and drives in a generally or substantially straight path, the angle of the trailer is at its zero (or substantially zero) degree angle and the system detects an offset angle to perform a calibration of the system. The following describes how the algorithms run and perform the calibration.

The first part of the algorithm looks at the average wheel speed for the left and right sides of the vehicle. When the mean speed of both sides is greater than zero and the difference between the two sides is within a given tolerance value, the second part of the algorithm engages. The second part of the algorithm looks at the angular movement of the trailer. This may be done using a target that is affixed to the trailer, but it could be extended to also look at the feature points, such as discussed above. If the angular movement of the trailer is within a tolerance level (in other words, not moving very much), and the first part still holds true (that there is straight or substantially straight movement of the vehicle), the angle calculation is averaged over a given period of time or distance traveled to calculate the offset, which is stored in the system memory and applied to subsequent angle calculations.

An alternative and simpler algorithm may function to read vehicle steering wheel angle through a vehicle network or bus. When the steering wheel angle is within a tolerance range of zero degrees, and vehicle wheel speed is greater than zero over a given period of time or distance traveled, the trailer angle is read and averaged as the offset that is stored in the system memory and applied to subsequent angle calculations.

Figures 9A, 9B:
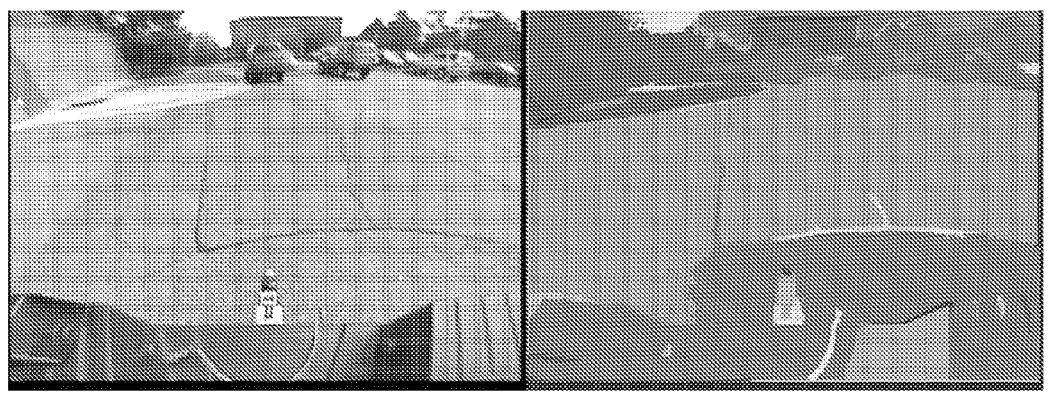
FIGS. 9A and 9B illustrate a hitch ball detection algorithm, with FIG. 9A showing a raw image and FIG. 9B showing an image after segmenting the image into similar regions in accordance with the present invention.
Figure 10:
FIG. 10 is an image showing the result of detecting edges of the segmented image of FIG. 9B in accordance with the present invention.
Figure 11:
FIG. 11 shows an image that represents the final result of the hitch ball detection algorithm of the present invention.

Hitch Ball Detection:

Optionally, the present invention may provide a hitch ball detection algorithm for detecting the hitch ball at the rear of the vehicle. The purpose of this algorithm is to locate the hitch ball to potentially assist the customer in hitching the trailer to the vehicle. The first step is to segment the image, such as can be seen with reference to FIGS. 9A and 9B (and such as by utilizing aspects of the system described in Felzenszwalb, P. F. and D. P. Huttenlocher, *Efficient graph-based image segmentation*. International Journal of Computer Vision, 2004. 59(2), p. 167-181, which is hereby incorporated herein by reference in its entirety). Once the image has been segmented, edges are detected, such as shown in FIG. 10. After edges are found, the Hough transform (such as by utilizing aspects of the system described in Duda, R. O. and P. E. Hart, *Use of the Hough transformation to detect lines and curves in pictures*. Communications of the ACM, 1972. 15(1), p. 11-15, which is hereby incorporated herein by reference in its entirety) is then run to detect circles. The Hough transform may be selected because of its ability to be invariant to missing data points, which could be the case with the image quality due to outdoor operating conditions. The search space is limited to look at the region where the hitch could possibly be located using the CAD data for the particular vehicle. The limited search space reduces false positives and improves the runtime of the algorithm.

Thus, the trailer monitoring or trailer angle detection system of the present invention may detect a target on or of a trailer or a portion of the trailer and may, such as via image processing, calculate and/or determine the angle of the trailer relative to the vehicle, such as relative to the longitudinal axis of the vehicle, such as via algorithmic processing. The image processing and algorithmic processing may comprise any suitable means for processing the images and/or image data. For example, the processing may utilize aspects described in U.S. Pat. Nos. 7,005,974; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or U.S. provisional applications, Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/563,965, filed Nov. 28, 2011; Ser. No. 61/559,970, filed Nov. 15, 2011; Ser. No. 61/556,556, filed Nov. 7, 2011; Ser. No. 61/554,663, filed Nov. 2, 2011; Ser. No. 61/550,664, filed Oct. 24, 2011; Ser. No. 61/552,167, filed Oct. 27, 2011; Ser. No. 61/548,902, filed Oct. 19, 2011; Ser. No. 61/540,256, filed Sep. 28, 2011; Ser. No. 61/539,049, filed Sep. 26, 2011; Ser. No. 61/537,279, filed Sep. 21, 2011; Ser. No. 61/513,745, filed Aug. 1, 2011; Ser. No. 61/511,738, filed Jul. 26, 2011; Ser. No. 61/503,098, filed Jun. 30, 2011, which are all hereby incorporated herein by reference in their entireties.

Typically, a rearward facing camera for a rear vision system or backup assist system is activated responsive to the driver of the equipped vehicle shifting the gear actuator into a reverse gear position, whereby video images captured by the camera are displayed at the video display screen. When the reversing maneuver is completed, such as when the driver of the vehicle finally shifts the gear actuator out of the reverse gear position (and into either a park or neutral position or a forward gear position), display of the images captured by the camera ceases and the camera is often deactivated. The vision display system may operate to display the rearward images at the video mirror display responsive to the driver of the vehicle shifting the vehicle into a reverse gear such as by utilizing aspects of the vision systems described in U.S. Pat. Nos. 5,550,677; 5,670,935; 6,498,620; 6,222,447; and/or 5,949,331, and/or PCT Application No. PCT/US2011/056295, filed Oct. 14, 2011, and/or U.S. patent application Ser. No. 13/333,337, filed Dec. 21, 2011, which are hereby incorporated herein by reference in their entireties.

During forward travel of the vehicle, such as when the vehicle shifter is shifted to a forward or drive gear position, the rear camera may capture images of the trailer for determining and monitoring the trailer angle, as discussed above. Such operation of the rear camera during forward travel (and associated processing of the captured images and the like) may be responsive to the vehicle speed reaching a threshold level and a signal indicative of the vehicle towing a trailer (such as a signal indicative of a connection of a trailer wiring harness to a vehicle wiring harness or the like), such that the activation of the rear camera and subsequent or corresponding monitoring of the trailer angle only occurs in situations when it is desired or appropriate.

The rearward facing camera or camera module may comprise any suitable camera or imaging sensor, and may utilize aspects of the cameras or sensors described in U.S. Pat. Nos. 7,965,336 and/or 7,480,149, and/or U.S. patent application Ser. No. 12/091,359, filed Apr. 24, 2008 and published Oct. 1, 2009 as U.S. Publication No. US-2009-0244361, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935;

5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,720,580; 7,965,336; 7,339,149; 7,038,577; and 7,004,606; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

Optionally, the rearward facing camera may have a wide angle rearward field of view, such as a wide angle rearward field of view that encompasses about 185 degrees (fields of view larger and smaller than this may be contemplated while remaining within the spirit and scope of the present invention). Thus, during a reversing maneuver, the rearward facing camera and video processor and video display screen can operate to display entire images (or substantially entire images) captured by the rearward facing camera (such as, for example, images encompassed by the about 185 degree field of view of the camera), in order to provide video images to the driver of the vehicle of a wide area or region or blind zone immediately rearward of the vehicle to assist the driver of the vehicle in making the reversing maneuver. The rearward facing camera and/or video processor and/or video display screen and/or backup assist system may utilize aspects of the systems described in U.S. Pat. Nos. 5,550,677; 5,760,962; 5,670,935; 6,201,642; 6,396,397; 6,498,620; 6,717,610; 6,757,109; 7,005,974; and/or 7,265,656, which are hereby incorporated herein by reference in their entireties.

The camera module and circuit chip or board and imaging sensor and processor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/618,686, filed Oct. 14; 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip (such as of the display or camera system or image processor or the like) may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

The display is operable to display the captured rearward images and may comprise a video display and may utilize aspects of the video display devices or modules described in U.S. Pat. Nos. 6,690,268; 7,184,190; 7,274,501; 7,370,983; 7,446,650; and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 6,198,409; 7,005,974; 7,123,168; 7,004,606; 6,946,978; 7,038,577; 6,353,392; 6,320,176; 6,313,454; and 6,824,281, which are all hereby incorporated herein by reference in their entireties.

The video display screen may disposed at an interior rearview mirror assembly of the vehicle (such as in a mirror casing and behind a reflective element of a mirror assembly such that displayed information is viewable through the reflective element of the mirror assembly). The interior mirror assembly may comprise an electro-optic reflective element, such as an electrochromic reflective element, having a transflective mirror reflector (such as one or more thin metallic films or coatings disposed on a surface of a substrate of the reflective element, such as disposed on the front surface of the rear substrate, commonly referred to as the third surface of the mirror reflective element) that is partially transmissive of visible light therethrough and partially reflectant of visible light incident thereon, such as a mirror reflective element of the types described in U.S. Pat. Nos. 7,274,501; 7,255,451; 7,195,381; 7,184,190; 5,668,663; 5,724,187 and/or 6,690,268, which are all hereby incorporated herein by reference in their entireties). Thus, the video display screen, when operating to display video images or the like, is viewable through the transflective mirror reflector and the mirror reflective element by the driver of the vehicle and, when the video display screen is not operating to display video images or the like, the video display screen is not readily viewable or observable or discernible to the driver of the vehicle, such that the presence of the video display screen is rendered covert by the transflective mirror reflector and the driver of the vehicle normally views the mirror reflector and reflective element to view the reflected rearward image at the mirror reflective element. Optionally, the video display screen may be disposed elsewhere in the vehicle, such as at or in an accessory module or windshield electronics module or overhead console or center stack region of the instrument panel or elsewhere at the instrument panel or other areas of the vehicle, while remaining within the spirit and scope of the present invention.

Optionally, the vision display system may operate to display the rearward images at the video mirror display and the bird's-eye or top down or panoramic images/view at the navigation or infotainment screen, and may do so responsive to the driver of the vehicle shifting the vehicle into a reverse gear (such as by utilizing aspects of the vision systems described in U.S. Pat. Nos. 5,550,677; 5,670,935; 6,498,620; 6,222,447; and/or 5,949,331, and/or PCT Application No. PCT/US2011/056295, filed Oct. 14, 2011, and/or PCT Application No. PCT/US2010/047256, filed Aug. 31, 2010 and published Mar. 10, 2011 as International Publication No. WO 2011/028686, which are hereby incorporated herein by reference in their entireties).

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018-A1, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, the vehicle may include one or more other accessories at or within the mirror assembly or otherwise associated with or near the mirror assembly, such as one or more electrical or electronic devices or accessories, such as a blind spot detection system, such as disclosed in U.S. Pat. Nos. 5,929,786; 8,058,977; 5,786,772; 7,720,580; 7,492,281; 7,038,577 and 6,882,287, a communication module, such as disclosed in U.S. Pat. No. 5,798,688, a voice recorder, microphones, such as disclosed in U.S. Pat. Nos. 7,657,052; 6,243,003; 6,278,377; and/or 6,420,975, speakers, antennas, including global positioning system (GPS) or cellular phone antennas, such as disclosed in U.S. Pat. No. 5,971,552, transmitters and/or receivers, such as a garage door opener or the like or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093 and/or U.S. patent application Ser. No. 12/781,119, filed May 17, 2010 and published Nov. 17, 2011 as U.S. Publication No. US 2011-0280026, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, an imaging system or components or, circuitry or display thereof, such as an imaging and/or display system of the types described in U.S. Pat. Nos. 7,881,496; 7,526,103; 7,400,435; 6,690,268 and 6,847,487, and/or U.S. patent application Ser. No. 12/578,732, filed Oct. 14, 2009; and/or Ser. No. 12/508,840, filed Jul. 24, 2009, an alert system, such as an alert system of the types described in PCT Application No. PCT/US2010/25545, filed Feb. 26, 2010 and published Sep. 2, 2010 as International Publication No. WO 2010/099416, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522), and/or an ONSTAR® system, a compass, such as disclosed in U.S. Pat. Nos. 5,924,212; 4,862,594; 4,937,945; 5,131,154; 5,255,442; and/or 5,632,092, a control system, such as a control system of the types described in PCT Application No. PCT/US10/38477, filed Jun. 14, 2010 and published Dec. 16, 2010 as International Publication No. WO 2010/144900, and/or any other accessory or circuitry or the like (with the disclosures of the above-referenced patents and patent applications and PCT applications being hereby incorporated herein by reference in their entireties).

The accessory or accessories may be positioned at or within a mirror casing of the interior rearview mirror assembly and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A rear vision system for a vehicle, said rear vision system comprising:
   at least a rearward facing camera disposed at a rearward portion of a vehicle equipped with said rear vision system;
   wherein said rearward facing camera is operable to capture images rearward of the equipped vehicle;
   wherein, when a trailer is attached to the equipped vehicle and is rearward of the equipped vehicle, a processor is operable to process the captured images and, responsive at least in part to said processing, is operable to determine a trailer angle of the trailer relative to a longitudinal axis of the equipped vehicle;
   wherein said processor determines a location of a target at or of the trailer relative to the equipped vehicle and determines the trailer angle of the trailer responsive to the determined location; and
   wherein the target comprises at least one of (a) an icon or shape or indicia disposed at a forward portion of the trailer, (b) an icon or shape or indicia established on a sheet attached at a forward portion of the trailer, (c) an icon or shape or indicia established at a forward portion of the trailer, (d) a target pattern established at a surface of the trailer or trailer tongue, (e) a colored pattern established at a surface of the trailer or trailer tongue and (f) a forward portion of the trailer.

2. The rear vision system of claim 1, wherein said processor determines the location of the target based at least in part by at least one of (a) a regressive 2-D histogram that detects a pattern at the trailer, (b) an image pattern matching algorithm, (c) a color matching algorithm, and (d) an edge detection algorithm.

3. The rear vision system of claim 1, wherein said rear vision system generates an alert signal to alert the driver of a potentially hazardous situation while the equipped vehicle is pulling the trailer in a forward direction.

4. The rear vision system of claim 1, wherein said processor determines a degree of swing or sway of the trailer during forward travel of the equipped vehicle.

5. The rear vision system of claim 1, wherein, during a reversing maneuver of the equipped vehicle, said processor is operable to process the captured images to determine a rearward trajectory of the trailer.

6. The rear vision system of claim 5, wherein said rear vision system provides a display indicative of the determined rearward trajectory to assist the driver in reversing the equipped vehicle and trailer.

7. The rear vision system of claim 5, wherein said rear vision system generates an alert signal to alert the driver of a potentially hazardous situation during the reversing maneuver.

8. The rear vision system of claim 5, wherein said processor determines a location of a target at or of the trailer relative to the equipped vehicle and determines the rearward trajectory of the trailer responsive to the determined location.

9. The rear vision system of claim 1, wherein said processor determines a location of a target at or of the trailer relative to the equipped vehicle and determines the trailer angle of the trailer responsive to the determined location, and wherein the target comprises at least one target pattern established at a surface of the trailer or trailer tongue.

10. The rear vision system of claim 9, wherein said processor matches a pattern template to said at least one target pattern to determine the presence and location of said at least one target pattern.

11. The rear vision system of claim 10, wherein said processor matches at least one color of said pattern template to at least one color of said at least one target pattern to determine the presence and location of said at least one target pattern.

12. A rear vision system for a vehicle, said rear vision system comprising:
   at least a rearward facing camera disposed at a rearward portion of a vehicle equipped with said rear vision system;
   wherein said rearward facing camera is operable to capture images rearward of the equipped vehicle;
   wherein, when a trailer is attached to the equipped vehicle and is rearward of the equipped vehicle, a processor is operable to process the captured images and, responsive at least in part to said processing, is operable to determine a trailer angle of the trailer relative to a longitudinal axis of the equipped vehicle;
   wherein said processor determines a location of a target at or of the trailer relative to the equipped vehicle and determines the trailer angle of the trailer responsive to the determined location;
   wherein the target comprises at least one of (a) an icon or shape or indicia disposed at a forward portion of the trailer, (b) an icon or shape or indicia established on a sheet attached at a forward portion of the trailer, (c) an icon or shape or indicia established at a forward portion of the trailer, (d) a target pattern established at a surface of the trailer or trailer tongue, (e) a colored pattern established at a surface of the trailer or trailer tongue and (f) a forward portion of the trailer;
   wherein said processor determines the location of the target based at least in part by at least one of (a) a regressive 2-D histogram that detects a pattern at the trailer, (b) an image pattern matching algorithm, (c) a color matching algorithm, and (d) an edge detection algorithm; and
   wherein said rear vision system generates an alert signal to alert the driver of a potentially hazardous situation while the equipped vehicle is pulling the trailer in a forward direction.

13. The rear vision system of claim 12, wherein said processor determines a degree of swing or sway of the trailer during forward travel of the equipped vehicle.

14. The rear vision system of claim 12, wherein, during a reversing maneuver of the equipped vehicle, said processor determines a rearward trajectory of the trailer responsive to the determined location of the target.

15. The rear vision system of claim 14, wherein said rear vision system provides a display indicative of the determined rearward trajectory to assist the driver in reversing the equipped vehicle and trailer.

16. The rear vision system of claim 14, wherein said rear vision system generates an alert signal to alert the driver of a potentially hazardous situation during the reversing maneuver.

17. A rear vision system for a vehicle, said rear vision system comprising:

at least a rearward facing camera disposed at a rearward portion of a vehicle equipped with said rear vision system;

wherein said rearward facing camera is operable to capture images rearward of the equipped vehicle;

wherein, when a trailer is attached to the equipped vehicle and is rearward of the equipped vehicle, a processor is operable to process the captured images and, responsive at least in part to said processing, is operable to determine a trailer angle of the trailer relative to a longitudinal axis of the equipped vehicle;

wherein said processor determines a location of a target at or of the trailer relative to the equipped vehicle and determines the trailer angle of the trailer responsive to the determined location;

wherein the target comprises at least one of (a) an icon or shape or indicia disposed at a forward portion of the trailer, (b) an icon or shape or indicia established on a sheet attached at a forward portion of the trailer, (c) an icon or shape or indicia established at a forward portion of the trailer, (d) a target pattern established at a surface of the trailer or trailer tongue, (e) a colored pattern established at a surface of the trailer or trailer tongue and (f) a forward portion of the trailer; and wherein at least one of (i) said processor determines a degree of swing or sway of the trailer during forward travel of the equipped vehicle, (ii) during a reversing maneuver of the equipped vehicle, said processor determines a rearward trajectory of the trailer responsive to the determined location of the target, and (iii) during a reversing maneuver of the equipped vehicle, said processor is operable to process the captured images to determine a rearward trajectory of the trailer and wherein said rear vision system provides a display indicative of the determined rearward trajectory to assist the driver in reversing the equipped vehicle and trailer.

18. The rear vision system of claim 17, wherein said rear vision system generates an alert signal to alert the driver of a potentially hazardous situation while the equipped vehicle is pulling the trailer in a forward direction.

19. The rear vision system of claim 17, wherein said rear vision system generates an alert signal to alert the driver of a potentially hazardous situation during a reversing maneuver of the equipped vehicle.

20. The rear vision system of claim 17, wherein said processor determines the location of the target based at least in part by at least one of (a) a regressive 2-D histogram that detects a pattern at the trailer, (b) an image pattern matching algorithm, (c) a color matching algorithm, and (d) an edge detection algorithm.

* * * * *

UNITED STATES PATENT AND TRADEMARK OFFICE
CERTIFICATE OF CORRECTION

PATENT NO. : 9,085,261 B2  
APPLICATION NO. : 13/979871  
DATED : July 21, 2015  
INVENTOR(S) : Yuesheng Lu et al.

Page 1 of 1

It is certified that error appears in the above-identified patent and that said Letters Patent is hereby corrected as shown below:

Specification

Column 5
Line 61, Insert --hitch-- after "vehicle's"

Signed and Sealed this
Thirty-first Day of May, 2016

Michelle K. Lee
*Director of the United States Patent and Trademark Office*